April 7, 1953 G. MILLER 2,633,746
ACTIVATED AIRPLANE WEATHER VANE
Filed May 29, 1951 2 SHEETS—SHEET 1

INVENTOR.
Grant Miller,
BY Victor J. Evans & Co.
ATTORNEYS

April 7, 1953 G. MILLER 2,633,746
ACTIVATED AIRPLANE WEATHER VANE
Filed May 29, 1951 2 SHEETS—SHEET 2
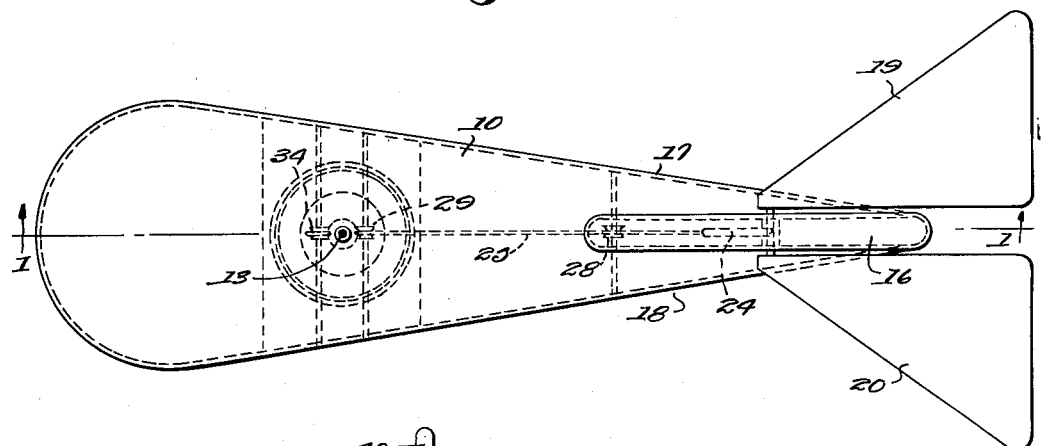
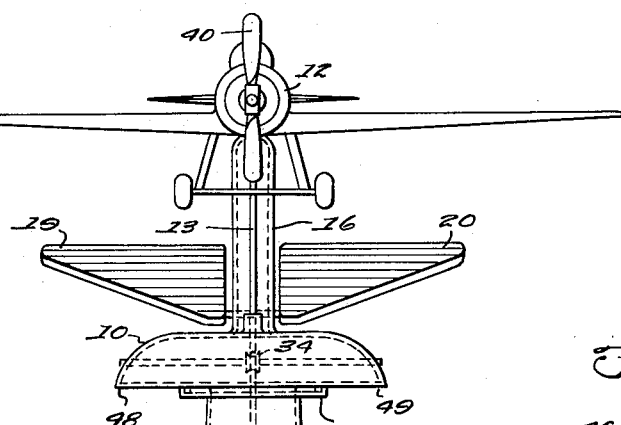
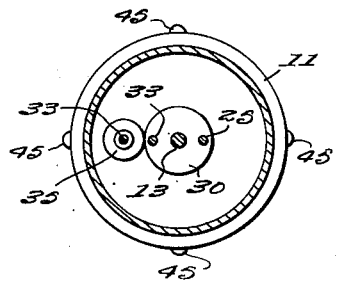
INVENTOR.
Grant Miller,
BY Victor J. Evans & Co.
ATTORNEYS Patented Apr. 7, 1953

2,633,746

UNITED STATES PATENT OFFICE 2,633,746

ACTIVATED AIRPLANE WEATHER VANE

Grant Miller, Washington, D. C.

Application May 29, 1951, Serial No. 228,947

2 Claims. (Cl. 73—189)

This invention relates to weather vanes of the type having movable elements rotatably mounted on the upper end of a post, and in particular this invention includes direction indicating arms journaled on the upper end of a post and having a small airplane with a propeller on the leading end carried by a vertically slidable rod and in which means is provided for raising and lowering the rod with the airplane thereon according to the velocity of the wind.

The purpose of this invention is to provide a weather vane which not only indicates the direction of the wind but also indicates the velocity by the position of an element thereon.

Weather vanes have been provided of various types and designs and figures, models, and other devices have been used in combination with direction indicating arms, but it is difficult to provide means on a weather vane for indicating, from a distance, the velocity of the wind. With this thought in mind this invention contemplates a weather vane having a pivotally mounted arm for showing the direction of the wind and also a vertically movable element carried by the arm and adapted to be elevated to positions above the arm as the velocity of wind passing over the weather vane increases.

The object of this invention is, therefore, to incorporate means for indicating the velocity of wind in a weather vane whereby the device is automatically operated.

Another object of the invention is to provide a weather vane having operating instrumentalities therein for operating a device to indicate the velocity of wind in which the operating elements are mounted within the weather vane casing and are, thereby, protected from the elements.

A further object of the invention is to provide an improved weather vane that also includes means for determining the velocity of wind passing thereover which is of a simple and economical construction.

With these and other objects and advantages in view the invention embodies a tubular post having a horizontally disposed arm rotatably mounted on the upper end with a vertically positioned rod mounted in the arm and having an airplane on the upper end, an L-shaped crank pivotally mounted in the arm and having baffles positioned in the path of wind passing over the arm and also having connections to the lower end of the rod on which the airplane is carried, and a counterweight positioned to coact with the L-shaped lever for urging the novelty airplane upwardly.

Other features and advantages of the invention will appear from the following description taken in connection with the drawings wherein:

Figure 2 is a plan view of the horizontally disposed arm being taken on line 2—2 of Figure 1.

Figure 3 is an end elevational view looking toward the front of the weather vane.

Figure 4 is a cross section through the post being taken on line 4—4 of Figure 1.

Figure 1:
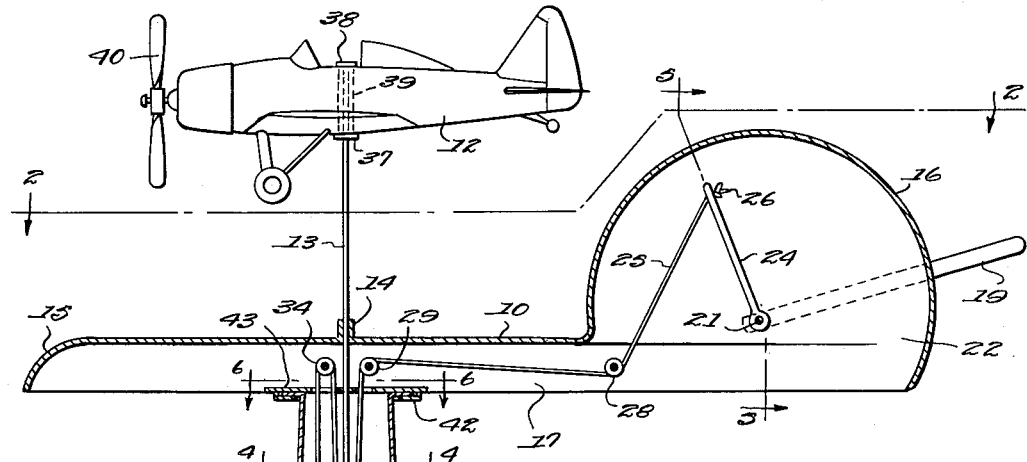
Figure 1 is a side elevational view of the horizontally disposed arm with a tubular post shown in section and with the section taken on line 1—1 of Figure 2.

Referring now to the drawings wherein like reference characters denote corresponding parts the improved weather vane of this invention includes a horizontally disposed arm 10, a post 11 on which the arm is rotatably mounted and an airplane which is mounted on the upper end of a rod 13 that extends upwardly from the upper end of the post 11 and through the arm 10, being slidably mounted in a bearing 14 on the upper surface of the arm.

Figure 5:
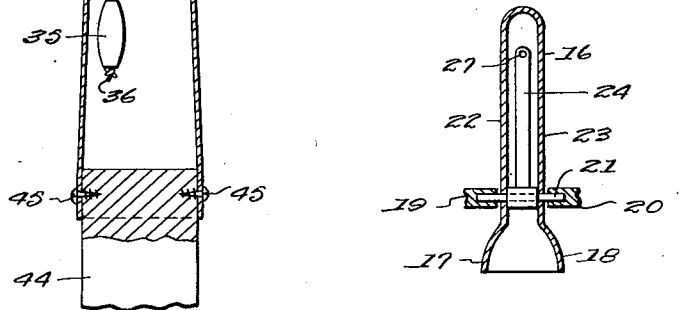
Figure 5 is a cross section through the trailing end of the arm being taken on line 5—5 of Figure 1.
Figure 6:
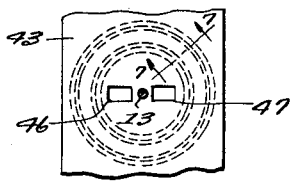
Figure 6 is a sectional plan through the lower part of the arm taken on line 6—6 of Figure 1.
Figure 7:
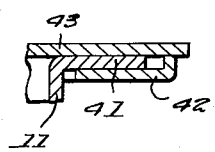
Figure 7 is a cross section on an enlarged scale taken on line 7—7 of Figure 6 illustrating the rotatable mounting of the horizontally disposed arm on the upper end of the post.

The arm 10 is formed as illustrated in Figures 1 and 2 with an enlarged forward section 15 and a comparatively narrow trailing section 16 and, as shown in Figures 1 and 5, the arm is provided with arcuate downwardly extended edges or flanges as indicated by the numerals 17 and 18.

The trailing section 16, which forms a rudder is substantially U-shaped in cross section, as shown in Figure 5 and substantially semi-circular in longitudinal section, as shown in Figure 1.

The weather vane is actuated by the rudder section 16 to indicate the direction of the wind and, extended from the sides of the section 16, are baffles 19 and 20 which are formed on the ends of a transversely disposed shaft 21 that is journaled in the side walls 22 and 23 of the trailing section 16.

The shaft 21 is provided with an arm 24, to the upper end of which a cord 25 is attached with a knot 26 on the end of the cord positioned on the far side of the arm. The cord extends through an opening 27 in the upper end of the arm, around a pulley 28 pivotally mounted in the lower struts of the horizontally disposed arm 10 and also around a pulley 29 also journaled in the lower part of the arm 10 and from which the cord passes downwardly to a plate 30 on the lower end of the rod 13. A knot 31 on the lower end of the cord secures the cord in the plate 30. A similar knot 32 also secures a cord 33 in the opposite end of the plate 30 and the cord 33 extends upwardly over a pulley 34 also journaled in the lower part of the arm 10 and from the pulley 34 the cord 33 extends downwardly through a counterweight 35 which is secured on the cord by a knot 36 at the lower end thereof.

With the rod 13 held in position in this manner it will be noted that the weight of the airplane 12 carries the rod downwardly when wind is not blowing and as the velocity of the wind increases the baffles 19 and 20 move downwardly about the pivotal mounting formed by the shaft 21 with the arm 24 moving upwardly to the position shown in Figure 1 wherein the cord 25 draws the plate 30, the rod 13 and the airplane 12 upwardly, as shown.

The airplane 12 is pivotally mounted on the upper end of the rod 13 whereby the airplane, as well as the arm 10 will follow the direction of the wind. The other part of the rod 13 is provided with a collar 37 and the airplane 12 is positioned between the collar 37 and a head 38 on the upper end of the rod. The rod extends through an opening as indicated by the dotted lines 39 in the body of the airplane.

The forward end of the airplane may be provided with a propeller 40 that may also spin in the wind.

The upper end of the tubular post 11 is provided with a flange 41 that is slidably held in an offset flange 42 extended downwardly from the lower surface of a crossplate 43 that is mounted between the edges of the horizontally disposed arm 10 and with the flange 41 free to slide in the flange 42 the arm 10 is free to swivel or rotate in a horizontal plane on the upper end of the post.

The lower end of the tubular post, the diameter of which is greater than that of the upper end is positioned over the upper end of a foundation post 44 and the lower end of the tubular post 11 may be secured to the post 44 by screws 45. The plate 43 is provided with openings 46 and 47 through which the cords 25 and 33 pass and, as shown in Figure 3, the ends of the plates 43 may be secured, by welding, at the points 48 and 49 to the lower edges of the arcuate flanges at the sides of the arm 10.

It will be understood that modifications may be made in the design and arrangement of the parts without departing from the spirit of the invention.

What is claimed is:

1. A weather vane comprising a horizontally disposed arm having a vertically positioned rudder on the trailing end, a post, means journaling the arm on the upper end of the post with the arm mounted to swivel in a horizontal plane, a vertically disposed rod slidably mounted in the arm and extended into the upper end of the post, a body carried by and rotatably mounted on the upper end of the rod, horizontally disposed baffles pivotally mounted in the rudder on the trailing end of the arm and extended from the sides of the said rudder, means connecting the baffles to the vertically disposed rod for moving the rod upwardly as the baffles are moved toward the horizontally disposed positions with increases in the velocity of wind passing over the arm, and a counterweight positioned in the post and coacting with the baffles for elevating the said rod.

2. In a weather vane, the combination which comprises a vertically positioned tubular post having an annular flange extended outwardly from the upper end, a hollow horizontally disposed arm having a vertically positioned rudder extended upwardly from the trailing end and having a transversely positioned plate extended across the intermediate part thereof, an offset flange extended downwardly from the lower surface of the transversely positioned plate and extended over the flange on the upper end of the post providing rotatable mounting means of the arm on the post, a vertically positioned rod slidably mounted in the arm and extended downwardly into the post, an airplane having a propeller on the forward end pivotally mounted on the upper end of the rod, baffles extended from the sides of the rudder of the arm pivotally mounted on the said post, an arm positioned in the rudder and extended from the pivotal mounting means of the baffles, a cord extended from the end of the arm in the rudder to the lower end of the vertically disposed rod, a counterweight in the post, a cord extended from the lower end of the vertically disposed rod to the counterweight, and a plurality of pulleys in the lower part of the horizontally disposed arm over which the cords are trained whereby the counterweight coacts with the baffle for elevating the vertically disposed rod and airplane with increased velocity of wind passing over the arm.

GRANT MILLER.

REFERENCES CITED

The following references are of record in the file of this patent:

UNITED STATES PATENTS

| Number | Name | Date |
|---|---|---|
| 764,759 | Owen | July 12, 1904 |
| 1,450,278 | Cave | Apr. 3, 1923 |
| 2,040,305 | Graham | May 12, 1936 |